No. 628,723. Patented July 11, 1899.
J. A. McKEE.
FRAME FOR BICYCLES, &c.
(Application filed Feb. 27, 1899.)
(No Model.)
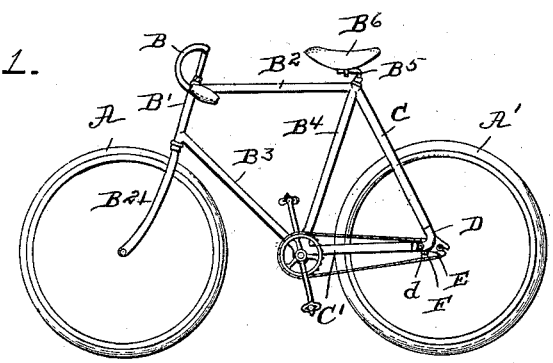
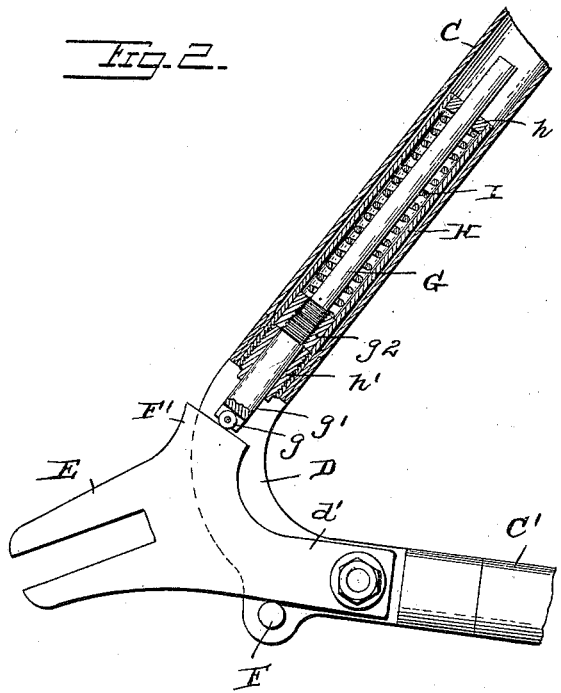
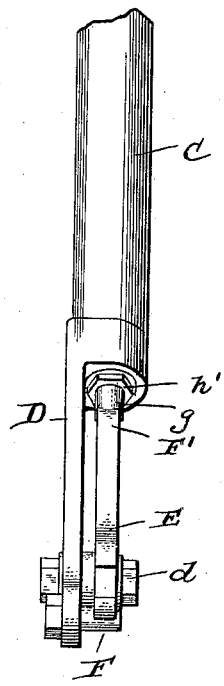
WITNESSES:
Mabel Hamilton
Frances Ellis
INVENTOR
John A. McKee
BY
Harding & Harding
ATTORNEYS

UNITED STATES PATENT OFFICE.

JOHN A. McKEE, OF PHILADELPHIA, PENNSYLVANIA, ASSIGNOR TO HIMSELF AND DOUGLAS D. WILLIAMS, OF SAME PLACE.

FRAME FOR BICYCLES, &c.

SPECIFICATION forming part of Letters Patent No. 628,723, dated July 11, 1899.

Application filed February 27, 1899. Serial No. 706,946. (No model.)

*To all whom it may concern:*

Be it known that I, JOHN A. MCKEE, a citizen of the United States, residing at Philadelphia, county of Philadelphia, and State of Pennsylvania, have invented a new and useful Improvement in Frames for Bicycles and Velocipedes, of which the following is a full, clear, and exact description, reference being had to the accompanying drawings, which form a part of this specification.

My invention has for its object to provide an improved construction of the rear frame, which makes said frame yielding, so as to minimize jars and shocks and also enabling the rear wheel to be readily removed.

My invention can be best understood by reference to the accompanying drawings, which illustrate an embodiment of my invention.

In the drawings, Figure 1 is a side elevation of a bicycle embodying my invention. Fig. 2 is a side elevation, partially in section, of an arc of the upper and lower rear stays. Fig. 3 is a rear view of the same.

A is the front wheel, A' the rear wheel, B the handle-bars, B' the head, B$^{2\prime}$ the front fork, B$^2$ the top bar, B$^3$ the bottom bar, B$^4$ the seat-post bar, B$^5$ the seat-post, and B$^6$ the seat, of a bicycle.

C is the upper rear stay, and C' the lower rear stay. These two stays are brazed to the connecting-piece D. Upon this connecting-piece D is the pivot-pin $d$, to which is pivoted the projection $d'$ from the rear yoke E. The rear yoke E is normally held from falling when the bicycle is raised by means of the bolt F, against which the projection $d'$ rests. By removing this bolt F and raising the bicycle the chain may readily be removed.

F' is a projection from the rear yoke, which rests against a roller $g$, secured to the projecting end $g'$ of a plunger G. This plunger has a head $g^2$, which works on a screw-thread on the plunger G. The plunger rests within a tube H within the upper rear stay and brazed to said stay. It is closed at the top for the bushing $h$, which is brazed to said tube H, leaving an orifice through which said plunger extends. Between the bushing $h$ and head $g^2$ is a spring $l$. The lever end of tube H is internally threaded, and a screw-threaded bushing $h'$ is secured therein. The projecting end $g'$ of the plunger G extends through this bushing $h'$. The strength of the spring $l$ may be increased or diminished by turning the piston-head $g^2$ or the bushing $h'$. Of course in place of a spring in the tube H air may be used.

As may be seen, all shocks on the rear wheel are transmitted to the roller through the spring $l$, and as a consequence is minimized and practically a resilient or yielding rear frame is provided without weakening the strength of the parts. It is also apparent so long as the bolt F is in place the bicycle may be lifted from the ground without separating the parts; but when the bolt is removed and the bicycle lifted from the ground the yoke will drop the wheel, releasing the chain.

Having now fully described my invention, what I claim, and desire to protect by Letters Patent, is—

1. In a bicycle or velocipede in combination with a pivoted rear yoke and the upper and lower rear stays of a spring within the stay, a plunger working against said spring, said plunger being in contact with said rear yoke.

2. In a bicycle or velocipede in combination with a pivoted rear yoke and the upper and lower rear stays of a tube within and secured to the stay, a plunger within said tube, a spring within said tube against which said plunger works, an extension for said plunger in contact with said rear yoke.

3. In a bicycle or velocipede in combination with a pivoted rear yoke and the upper and lower rear stays of a tube within and secured to the stay, a plunger within said tube, said plunger having a movable head, a spring within said tube against which said plunger works, an extension from said plunger in contact with said yoke.

4. In a bicycle or velocipede in combination with a pivoted rear yoke and the upper and lower rear stays of a tube within and secured to said stay, a plunger within said tube, a spring within said tube against which said plunger works, an extension for said plunger and a roller on said extension in contact with said yoke.

5. In a bicycle or velocipede in combination with a pivoted rear yoke and the upper and lower rear stays of a tube within and secured to the stay, a plunger within said tube, said plunger having a movable head, a spring within said tube against which said plunger works, an extension from said plunger, and a roller on said extension in contact with said yoke.

6. In a bicycle or velocipede in combination with the pivoted rear yoke and the upper and lower rear stays of a spring within the stay, a plunger provided with a movable head working against said spring, said plunger being in contact with the rear yoke.

In testimony of which invention I have hereunto set my hand, at Philadelphia, Pennsylvania, on this 16th day of February, 1899.

JOHN A. McKEE.

Witnesses:
 FRANCES ELLIS,
 MABEL HAMILTON.